United States Patent
Angerfors

(10) Patent No.: US 12,116,067 B2
(45) Date of Patent: Oct. 15, 2024

(54) METHOD FOR CONTROLLING A WHEEL AXLE ASSEMBLY

(71) Applicant: Volvo Truck Corporation, Gothenburg (SE)

(72) Inventor: Dan Angerfors, Floda (SE)

(73) Assignee: Volvo Truck Corporation, Gothenburg (SE)

(*) Notice: Subject to any disclaimer, the term of this patent is extended or adjusted under 35 U.S.C. 154(b) by 254 days.

(21) Appl. No.: 17/783,748

(22) PCT Filed: Dec. 16, 2019

(86) PCT No.: PCT/EP2019/085409
§ 371 (c)(1),
(2) Date: Jun. 9, 2022

(87) PCT Pub. No.: WO2021/121547
PCT Pub. Date: Jun. 24, 2021

(65) Prior Publication Data
US 2023/0015462 A1    Jan. 19, 2023

(51) Int. Cl.
*B62D 7/15* (2006.01)
*B60Q 9/00* (2006.01)
(Continued)

(52) U.S. Cl.
CPC .............. *B62D 7/159* (2013.01); *B60Q 9/00* (2013.01); *B62D 7/142* (2013.01)

(58) Field of Classification Search
CPC ........ B62D 7/159; B62D 7/142; B62D 13/02; B60Q 9/00
See application file for complete search history.

(56) References Cited

U.S. PATENT DOCUMENTS 5,430,650 A * 7/1995 Susuki .................. B62D 7/159
701/42
2009/0292421 A1 11/2009 Williams
(Continued)

FOREIGN PATENT DOCUMENTS

CN     103608242 A     2/2014
CN     104093626 A    10/2014
(Continued)

OTHER PUBLICATIONS

International Search Report and Written Opinion for International Patent Application No. PCT/EP2019/085409, mailed Sep. 3, 2020, 14 pages.
(Continued)

*Primary Examiner* — Jacob M Amick
(74) *Attorney, Agent, or Firm* — Withrow & Terranova, PLLC

(57) ABSTRACT

A method for controlling a wheel axle assembly of a vehicle. The vehicle comprises a vehicle body with a longitudinal axis extending in a longitudinal direction, a transversal axis extending in a transversal direction and a vertical axis extending in a vertical direction. The longitudinal axis, the transversal axis and the vertical axis are perpendicular to each other.
The longitudinal direction corresponds to an intended direction of travel of the vehicle and the vertical direction being parallel to a vertical line when the vehicle is positioned on a flat horizontally extending surface. The vehicle body comprises a vehicle body centre plane extending along the longitudinal axis and the vertical axis and separating the vehicle body into two body halves.

19 Claims, 2 Drawing Sheets

(51) Int. Cl.
   *B62D 7/14*         (2006.01)
   *B62D 13/02*        (2006.01)

(56)        References Cited

U.S. PATENT DOCUMENTS

2010/0198441 A1    8/2010  Mizuno et al.
2012/0059552 A1    3/2012  Mori et al.
2016/0039416 A1*   2/2016  Shimokawa .......... B60W 10/16
                                                       701/36

FOREIGN PATENT DOCUMENTS

DE       4428342 A1      2/1995
EP       0468567 A1      1/1992
EP       0545667 A2 *    6/1993
EP       2311651 A1      4/2011
EP       2428374 A1      3/2012
FR       2355703 A1      1/1978
JP       2008162371 A    7/2008
WO       2018010799 A1   1/2018

OTHER PUBLICATIONS

First Office Action for Chinese Patent Application No. 201980102975.6, mailed Jan. 11, 2024.
1 Second Office Action for Chinese Patent Application No. 201980102975.6, mailed Jun. 5, 2024, 21 pages.

* cited by examiner

METHOD FOR CONTROLLING A WHEEL AXLE ASSEMBLY

This application is a 35 USC 371 national phase filing of International Application No. PCT/EP2019/085409, filed Dec. 16, 2019, the disclosure of which is incorporated herein by reference in its entirety.

TECHNICAL FIELD

The invention relates to a method for controlling a wheel axle assembly of a vehicle. Moreover, the present invention relates to a control unit for controlling a wheel axle assembly of a vehicle. Furthermore, the present invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as buses or working machines.

BACKGROUND

The rolling resistance of a vehicle may contribute to the energy consumption of a vehicle. In order to keep the rolling resistance appropriately low, US 2010/0198441 A1 proposes that the toe angle of steerable wheels of a vehicle be controlled. However, there is still a need for improving methods and systems for reducing rolling resistance.

SUMMARY

An object of the invention is to provide a method for controlling a wheel axle assembly of a vehicle, which method can result in an appropriately low rolling resistance in a straightforward manner.

According to a first aspect of the invention, the above object is achieved by a method according to claim 1.

As such, the present invention relates to a method for controlling a wheel axle assembly of a vehicle.

The vehicle comprises a vehicle body with a longitudinal axis extending in a longitudinal direction, a transversal axis extending in a transversal direction and a vertical axis extending in a vertical direction. The longitudinal axis, the transversal axis and the vertical axis are perpendicular to each other.

The longitudinal direction corresponds to an intended direction of travel of the vehicle and the vertical direction is parallel to a vertical line when the vehicle is positioned on a flat horizontally extending surface.

The vehicle body comprises a vehicle body centre plane extending along the longitudinal axis and the vertical axis and separating the vehicle body into two body halves. The wheel axle assembly comprises a wheel axle and at least a first and a second wheel. The first and second wheels are located on opposite sides of the vehicle body centre plane. The wheel axle has a wheel axle centreline extending in a direction between the first and second wheels.

The wheel axle assembly is pivotally connected to the vehicle body around a pivot axis such that a wheel axle angle, being an angle between the wheel axle centreline and a line extending parallel to the transversal axis, can be varied.

The vehicle further comprises an adjustable reaction actuator connecting a portion of the vehicle body to a portion of the wheel axle whereby the condition of the adjustable reaction actuator controls the wheel axle angle.

The method according to the first aspect of the invention comprises determining a current vehicle operating condition and controlling the adjustable reaction actuator to assume a low roll resistance condition on the basis of the determined vehicle operating condition. The low roll resistance condition results in a rolling resistance of the wheel axle assembly being equal to or below a desired rolling resistance value.

Thus, what the inventor of the present invention has realized is that the wheel axle angle, defined as above, can be modified in dependence of determined vehicle operating condition. Thus, instead of, or in addition to, controlling the toe angle for steerable wheels, the rolling resistance can be reduced by controlling the above-mentioned wheel axle angle. Moreover, the method of the present invention may imply an appropriately low wear level of the wheels of the vehicle.

Optionally, determining the current vehicle operating condition comprises determining a current speed of the vehicle. The current speed may be useful information when controlling the adjustable reaction actuator.

Optionally, determining the current vehicle operating condition comprises determining an axle load imparted on the wheel axle assembly. The axle load may be useful information when controlling the adjustable reaction actuator.

Optionally, determining the current vehicle operating condition comprises determining ground condition information indicative of the condition of the ground on which the vehicle currently is travelling. Optionally, the ground condition information comprises information indicative of the magnitude and/or direction of the inclination of the ground on which the vehicle currently is travelling.

The ground condition information, such as magnitude and/or direction of the inclination of the ground, may be useful information when controlling the adjustable reaction actuator. For instance, if the vehicle is travelling on a sideway inclining road segment, such as a cambered road segment, the rolling resistance may be kept appropriately low if the control of the adjustable reaction actuator takes such an inclination into account.

Optionally, determining the current vehicle operating condition comprises determining a load imparted on the adjustable reaction actuator. As such, the load imparted on the adjustable reaction actuator may be used as a measure indicative of the rolling resistance which in turn implies an appropriate control of the adjustable reaction actuator.

Optionally, the method comprises varying the condition of the adjustable reaction actuator and detecting a resulting load imparted on the adjustable reaction actuator until the resulting load imparted on the adjustable reaction actuator is equal to or below a desired load value. As such, the wheel axle angle may be varied until an appropriately low rolling resistance, indicated by a resulting load value equal to or below the desired load value, is obtained. Thus, the resulting load imparted on the adjustable reaction actuator may be used as a measure indicative of the rolling resistance and the desired load value may be used as the desired rolling resistance value.

Optionally, the vehicle comprises a propulsion assembly adapted to propel at least the wheels comprised in the wheel axle assembly. The method comprises ensuring that the wheel axle assembly is operated in a free rolling condition in which at least the wheels comprised in the wheel axle assembly are unpowered by, preferably disconnected from, the propulsion assembly when varying the condition of the adjustable reaction actuator and detecting a resulting load imparted on the adjustable reaction actuator until the resulting load imparted on the adjustable reaction actuator is equal to or below a desired load value. When the wheel axle assembly is operated in the free rolling condition, it may be straightforward to relate the resulting load imparted on the adjustable reaction actuator to the rolling resistance of the wheel axle assembly.

Optionally, the method further comprises comparing the resulting load imparted on the adjustable reaction actuator to a load threshold value and in response to the resulting load imparted on the adjustable reaction actuator being equal to or exceeding the load threshold value, issuing a warning signal, preferably issuing a warning signal to an operator of the vehicle. The above procedure may be used for detecting a malfunctioning wheel axle assembly.

Optionally, the adjustable reaction actuator is hydraulically adjustable or electrically adjustable.

Optionally, each one of the wheels of the wheel axle assembly is connected to the wheel axle such that a fixed steering angle between the wheel and the wheel axle is obtained. Put differently, the wheels of the wheel axle assembly are not steerable wheels.

A second aspect of the present invention relates to a control unit for controlling a wheel axle assembly of a vehicle.

The vehicle comprises a vehicle body with a longitudinal axis extending in a longitudinal direction, a transversal axis extending in a transversal direction and a vertical axis extending in a vertical direction. The longitudinal axis, the transversal axis and the vertical axis are perpendicular to each other.

The longitudinal direction corresponds to an intended direction of travel of the vehicle and the vertical direction is parallel to a vertical line when the vehicle is positioned on a flat horizontally extending surface.

The vehicle body comprises a vehicle body centre plane extending along the longitudinal axis and the vertical axis and separating the vehicle body into two body halves. The wheel axle assembly comprises a wheel axle and at least a first and a second wheel. The first and second wheels are located on opposite sides of the vehicle body centre plane. The wheel axle has a wheel axle centreline extending in a direction between the first and second wheels.

The wheel axle assembly is pivotally connected to the vehicle body around a pivot axis such that a wheel axle angle, being an angle between the wheel axle centreline and a line extending parallel to the transversal axis, can be varied.

The vehicle further comprises an adjustable reaction actuator connecting a portion of the vehicle body to a portion of the wheel axle whereby the condition of the adjustable reaction actuator controls the wheel axle angle.

The control unit is adapted to receive vehicle operating information indicative of a current vehicle operating condition and to issue a control signal to the adjustable reaction actuator to assume a low roll resistance condition on the basis of the received vehicle operating information. The low roll resistance condition results in a rolling resistance of the wheel axle assembly being equal to or below a desired rolling resistance value.

Optionally, the vehicle operating information comprises information indicative of a current speed of the vehicle.

Optionally, the vehicle operating information comprises information indicative of an axle load imparted on the wheel axle assembly.

Optionally, the vehicle operating information comprises ground condition information indicative of the condition of the ground on which the vehicle currently is travelling.

Optionally, the ground condition information comprises information indicative of the magnitude and/or direction of the inclination of the ground on which the vehicle currently is travelling.

Optionally, the vehicle operating information comprises information indicative of a load imparted on the adjustable reaction actuator.

Optionally, the control unit is adapted to issue the control signal to the adjustable reaction actuator such that the condition of the adjustable reaction actuator is varied and receive information indicative of a resulting load imparted on the adjustable reaction actuator until the resulting load imparted on the adjustable reaction actuator is equal to or below a desired load value.

Optionally, the vehicle comprises a propulsion assembly adapted to propel at least the wheels comprised in the wheel axle assembly, the control unit being adapted to receive information indicative of that the wheel axle assembly is operated in a free rolling condition in which at least the wheels comprised in the wheel axle assembly are unpowered by, preferably disconnected from, the propulsion assembly and in response thereto issue the control signal to the adjustable reaction actuator such that the condition of the adjustable reaction actuator is varied and receive information indicative of a resulting load imparted on the adjustable reaction actuator until the resulting load imparted on the adjustable reaction actuator is equal to or below a desired load value.

Optionally, the control unit is adapted to compare said resulting load imparted on said adjustable reaction actuator to a load threshold value and in response to said resulting load imparted on said adjustable reaction actuator being equal to or exceeding said load threshold value, issue a warning signal, preferably issue a warning signal to an operator of the vehicle.

A third aspect of the present invention relates to a vehicle comprising a vehicle body with a longitudinal axis extending in a longitudinal direction, a transversal axis extending in a transversal direction and a vertical axis extending in a vertical direction. The longitudinal axis, the transversal axis and the vertical axis are perpendicular to each other.

The longitudinal direction corresponds to an intended direction of travel of the vehicle and the vertical direction is parallel to a vertical line when the vehicle is positioned on a flat horizontally extending surface.

The vehicle body comprises a vehicle body centre plane extending along the longitudinal axis and the vertical axis and separating the vehicle body into two body halves. The wheel axle assembly comprises a wheel axle and at least a first and a second wheel. The first and second wheels are located on opposite sides of the vehicle body centre plane. The wheel axle has a wheel axle centreline extending in a direction between the first and second wheels.

The wheel axle assembly is pivotally connected to the vehicle body around a pivot axis such that a wheel axle angle, being an angle between the wheel axle centreline and a line extending parallel to the transversal axis, can be varied.

The vehicle further comprises an adjustable reaction actuator connecting a portion of the vehicle body to a portion of the wheel axle whereby a condition of the adjustable reaction actuator controls the wheel axle angle.

The vehicle according to the third aspect of the present invention comprises a control unit according to the second aspect of the present invention.

Optionally, the adjustable reaction actuator is hydraulically adjustable or electrically adjustable.

Optionally, each one of the wheels of the wheel axle assembly is connected to the wheel axle such that a fixed steering angle between the wheel and the wheel axle is obtained.

BRIEF DESCRIPTION OF THE DRAWINGS

With reference to the appended drawings, below follows a more detailed description of embodiments of the invention cited as examples.

In the drawings.

DETAILED DESCRIPTION

The invention will be described below for a vehicle in the form of a truck 10 such as the truck illustrated in FIG. 1. The truck 10 should be seen as an example of a vehicle for which the method according to the present invention could be carried out or which vehicle could comprise the control unit according to the present invention. However, the method or control unit may be implemented in a plurality of different types of vehicles, such as a truck, a tractor, a car, a bus, a work machine such as a wheel loader or any other type of construction equipment.

The vehicle 10 comprises a vehicle body 12 with a longitudinal axis L extending in a longitudinal direction, a transversal axis T extending in a transversal direction and a vertical axis V extending in a vertical direction. The longitudinal axis L, the transversal axis T and the vertical axis V are perpendicular to each other.

Figure 1:
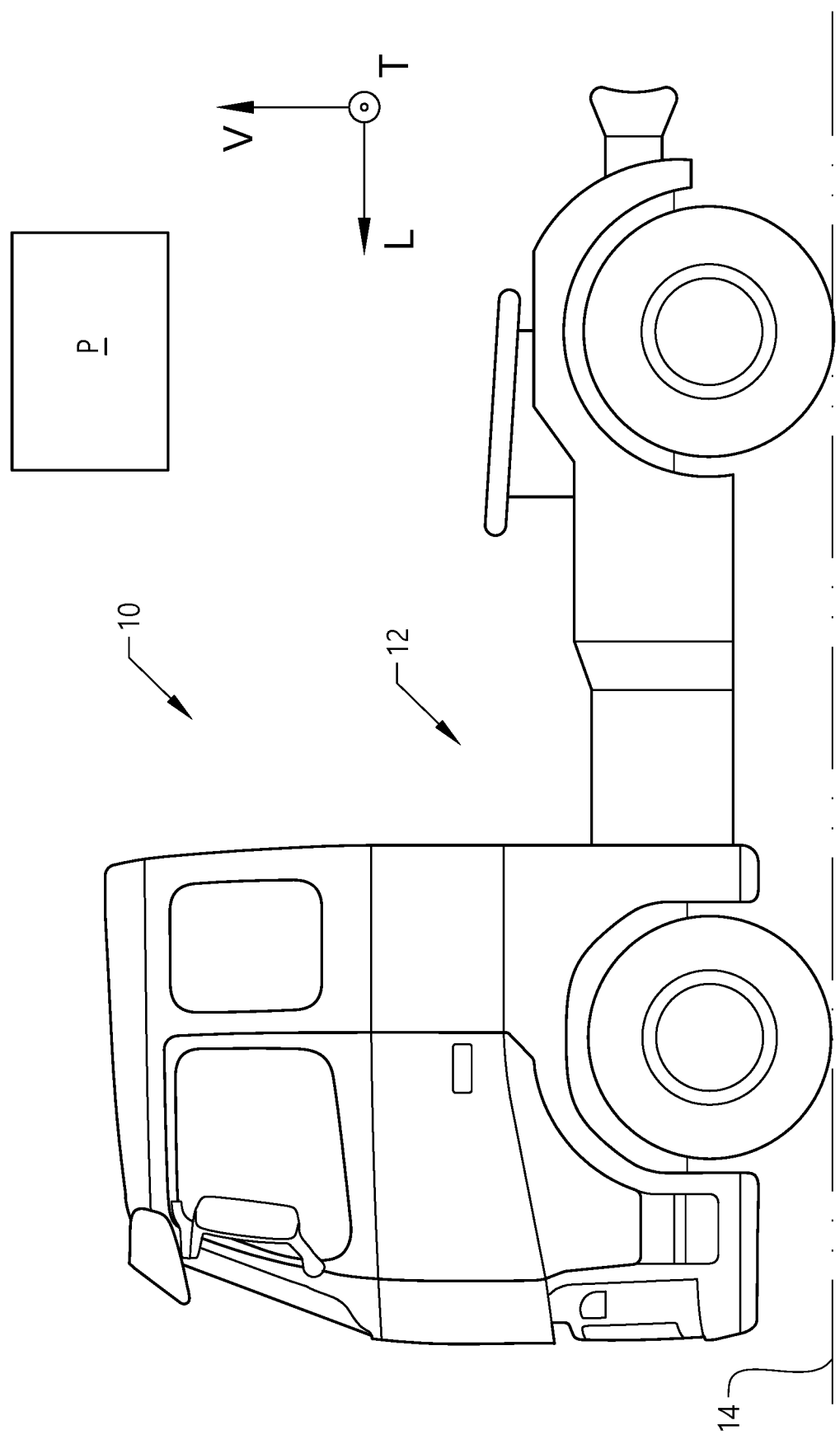
FIG. 1 is a side view of a vehicle.

Moreover, as indicated in FIG. 1, the longitudinal direction L corresponds to an intended direction of travel of the vehicle and the vertical direction V is parallel to a vertical line when the vehicle is positioned on a flat horizontally extending surface 14.

Figure 2:
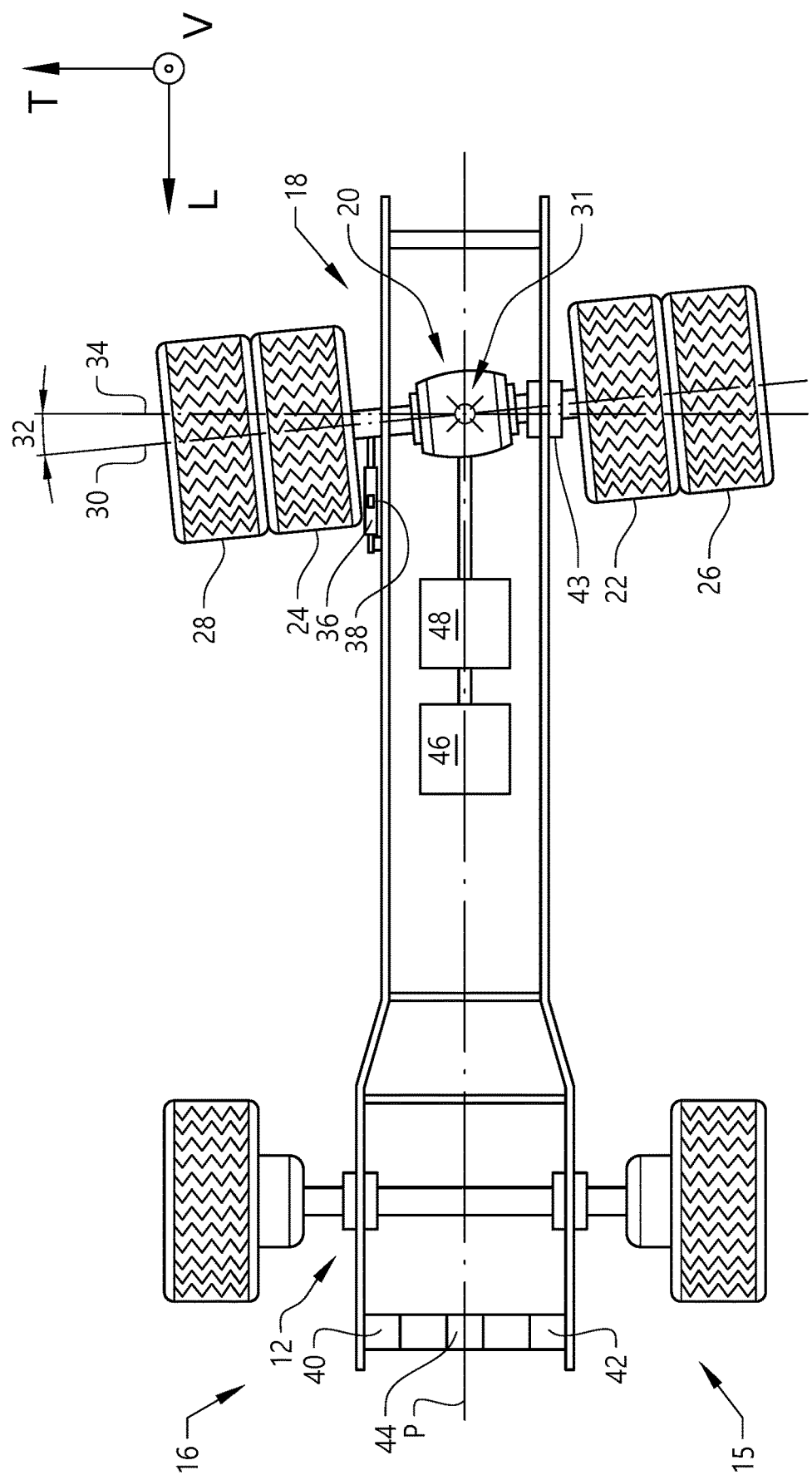
FIG. 2 illustrates a top view of a portion of a vehicle.

FIG. 2 is a top view of a vehicle body 12, such as the FIG. 1 vehicle body 12. The vehicle body 12 comprises a vehicle body centre plane P (such a plane is also indicated in FIG. 1) extending along the longitudinal axis L and the vertical axis V and separating the vehicle body 12 into two body halves 15, 16, viz a first body half 15 and a second body half 16.

FIG. 2 further illustrates a wheel axle assembly 18 comprising a wheel axle 20 and at least a first wheel 22 and a second wheel 24. The first and second wheels 22, 24 are located on opposite sides of the vehicle body centre plane P. In the FIG. 2 implementation, the wheel axle assembly 18 comprises two wheels 22, 26 in the first body half 15 and two wheels 24, 28 in the second body half 16.

The wheel axle 20 has a wheel axle centreline 30 extending in a direction between the first and second wheels 22, 24. Purely by way of example, each one of the wheels 22, 24, 26, 28 of the wheel axle assembly 18 is connected to the wheel axle 20 such that a fixed steering angle between the wheel and the wheel axle is obtained.

Furthermore, as illustrated in FIG. 2, the wheel axle assembly 18 is pivotally connected to the vehicle body 12 around a pivot axis 31 such that a wheel axle angle 32, being an angle between the wheel axle centreline 30 and a line 34 extending parallel to the transversal axis T, can be varied. To this end, the vehicle 10 further comprises an adjustable reaction actuator 36 connecting a portion of the vehicle body 12 to a portion of the wheel axle 20 whereby a condition of the adjustable reaction actuator 36 controls the wheel axle angle 32. Purely by way of example, the pivot axis 31 may extend in a direction parallel to the vertical axis V.

In the FIG. 2 embodiment, the adjustable reaction actuator 36 is implemented as an adjustable reaction actuator rod. As such, in the FIG. 2 embodiment, the condition of the adjustable reaction actuator 36 that controls the wheel axle angle 32 is the length of the adjustable reaction rod. However, it is also envisaged that the adjustable reaction actuator 36 may be adapted to impart a pivoting moment on the wheel axle assembly 18 to thereby alter the wheel axle angle 32.

As a non-limiting example, the adjustable reaction actuator 36 may be hydraulically adjustable or electrically adjustable.

Purely by way of example, and as indicated in FIG. 2, the adjustable reaction actuator 36 comprises a load sensing unit 38 adapted to detect an imparted load on the adjustable reaction actuator 36. Depending on the implementation of the adjustable reaction actuator 36, the detected load may be a linear load, i.e. a force, or a moment. As another non-limiting example, for a hydraulically adjustable reaction actuator 36, the detected load may be a detected hydraulic pressure, e.g. a detected hydraulic pressure in a chamber (not shown) of the actuator 36.

Furthermore, the vehicle 10 may comprise a control unit 40 which is preferably an electronic control unit. The control unit 40 may be adapted to receive information from one or more sensors. Purely by way of example, the one or more sensors may include at least one of a vehicle speed sensor 42, an axle load sensor 43 adapted to determine a load imparted on the wheel axle assembly 18 and a ground condition sensor 44. Purely by way of example, the ground condition sensor 44 may comprise an inclinometer (not shown) and/or means for determining the current position of the vehicle 10. As another alternative, instead of or in addition to the above-mentioned sensors, the one or more sensors may include the load sensing unit 38 mentioned above.

To this end, the control unit 40 may be in communication, through wireless and/or wire based communication means, to the relevant sensors 38, 42, 44.

Moreover, FIG. 2 illustrates that the vehicle comprises a propulsion assembly 46 adapted to propel at least the wheels 22, 24, 26, 28 comprised in the wheel axle assembly 18. Purely by way of example, the propulsion assembly 46 may comprise an internal combustion engine and/or an electric motor. Moreover, the vehicle 10 may comprise a clutch assembly 48 for selectively drivingly connecting the propulsion assembly 46 to the wheel axle assembly 18.

The present invention will be presented hereinbelow with reference to the control unit 40. However, it should be noted that the below presentation also should be regarded as a description of a method embodiment of the invention as well as an embodiment of the vehicle according to the present invention.

The control unit 40 is adapted to receive vehicle operating information indicative of a current vehicle operating condition and to issue a control signal to the adjustable reaction actuator 36 to assume a low roll resistance condition on the basis of the received vehicle operating information. The low roll resistance condition results in a rolling resistance of the wheel axle assembly 18 being equal to or below a desired rolling resistance value.

As a non-limiting example, the rolling resistance may be defined as the force required to move the vehicle on the current ground and at the current speed. As such, the rolling resistance, as well as the rolling resistance value, may be expressed in terms of a force, e.g. in terms of Newtons. As another non-limiting example, the rolling resistance may be defined as the force per unit vehicle weight required to move the vehicle on the current ground and at the current speed. In such an example, the rolling resistance, as well as the rolling resistance value, may be expressed in terms of a force per unit weight, e.g. in terms of Newtons/kilograms.

Purely by way of example, the vehicle operating information may comprise information indicative of at least one of the following: current speed of the vehicle, an axle load imparted on the wheel axle assembly 18 and the condition of the ground on which the vehicle 10 currently is travelling. To this end, the control unit 40 may receive relevant information from the previously mentioned sensors 42, 43, 44. Moreover, the control unit may further use a look-up table and/or an equation for determining the low roll resistance condition on the basis of the received vehicle operating information.

As a non-limiting example, the ground condition information may comprise information indicative of the magnitude and/or direction of the inclination of the ground on which the vehicle 10 currently is travelling.

Instead of, or in addition to, the above-mentioned ground condition information examples, the vehicle operating information may comprise information indicative of a load imparted on the adjustable reaction actuator 36. As such, the control unit 40 may be adapted to receive relevant information from the previously mentioned load sensing unit 38.

To this end, the control unit 40 may be adapted to issue the control signal to the adjustable reaction actuator 36 such that the condition of the adjustable reaction actuator is varied, resulting in that the wheel axle angle 32 is varied, and receive information indicative of a resulting load imparted on the adjustable reaction actuator 36 until the resulting load imparted on the adjustable reaction actuator 36 is equal to or below a desired load value.

As a non-limiting example, the control unit 40 may be adapted to issue the control signal to the adjustable reaction actuator 36 such that the condition of the adjustable reaction actuator is varied and receive information indicative of a resulting load imparted on the adjustable reaction actuator 36 until a minimum resulting load imparted on the adjustable reaction actuator 36 is obtained.

The above procedure may be performed when the wheel axle assembly 18 is operated in a free rolling condition. As such, and as has been intimated above, the vehicle 10 comprises a propulsion assembly 46 adapted to propel at least the wheels 22, 24, 26, 28 comprised in the wheel axle assembly 18.

Moreover, the control unit 40 may be adapted to receive information indicative of that the wheel axle assembly 18 is operated in a free rolling condition in which at least the wheels 22, 24, 26, 28 comprised in the wheel axle assembly 18 are unpowered by, preferably disconnected from, the propulsion assembly 46. Purely by way of example, the control unit 40 may be adapted to receive information from the clutch assembly 48 that the propulsion assembly 46 is disconnected from the wheel axle assembly 18. As another non-limiting example, the control unit 40 may be adapted issue a control signal to the clutch assembly 48 such that the propulsion assembly 46 is disconnected from the wheel axle assembly 18. Preferably, the free rolling condition may be such that each wheel of the vehicle 10 is unpowered by, preferably disconnected from, the propulsion assembly 46.

Moreover, the control unit 40 may further be adapted to, in response to receiving information indicative of that said wheel axle assembly 18 is operated in a free rolling condition, issue the control signal to the adjustable reaction actuator 36 such that the condition of the adjustable reaction actuator 36 is varied and receive information indicative of a resulting load imparted on the adjustable reaction actuator 36 until the resulting load imparted on the adjustable reaction actuator 36 is equal to or below a desired load value.

Again, purely by way of example, the control unit 40 may be adapted to, in response to receiving information indicative of that said wheel axle assembly 18 is operated in a free rolling condition, issue the control signal to the adjustable reaction actuator 36 such that the condition of the adjustable reaction actuator is varied and receive information indicative of a resulting load imparted on the adjustable reaction actuator 36 until a minimum resulting load imparted on the adjustable reaction actuator 36 is obtained.

Furthermore, although by way of example only, the control unit 40 may be adapted to compare the resulting load imparted on the adjustable reaction actuator 36 to a load threshold value and in response to the resulting load imparted on the adjustable reaction actuator 36 being equal to or exceeding the load threshold value, issue a warning signal, preferably issue a warning signal to an operator of the vehicle 10. Using the above procedure, it may be possible to detect a malfunctioning wheel axle assembly 18. A malfunctioning wheel axle assembly 18 may for instance be occasioned by a wheel puncture and/or a malfunctioning brake system (not shown).

Although the above control unit 40 has been presented hereinabove with reference to one wheel axle assembly 18, it is of course envisaged that embodiments of the control unit 40 may be adapted to issue control signals to a plurality of wheel axle assemblies for vehicles comprising a plurality of wheel axle assemblies. In a similar vein, although the method and/or vehicle according to the present invention has been presented hereinabove with reference to one wheel axle assembly 18, it is of course envisaged that embodiments of the method and/or vehicle may control each one of a plurality of wheel axle assemblies.

The invention claimed is:

1. A method for controlling a wheel axle assembly of a vehicle,
    the vehicle comprising a vehicle body with a longitudinal axis extending in a longitudinal direction, a transversal axis extending in a transversal direction, and a vertical axis extending in a vertical direction, the longitudinal axis, the transversal axis, and the vertical axis being perpendicular to each other,
    wherein the longitudinal direction corresponds to an intended direction of travel of the vehicle and the vertical direction being parallel to a vertical line when the vehicle is positioned on a flat horizontally extending surface,
    the vehicle body comprising a vehicle body centre plane extending along the longitudinal axis and the vertical axis and separating the vehicle body into two body halves,
    the wheel axle assembly comprising a wheel axle and at least a first and a second wheel, the first and the second wheels being located on opposite sides of the vehicle body centre plan, the wheel axle having a wheel axle centreline extending in a direction between the first and the second wheels, the wheel axle assembly being pivotally connected to the vehicle body around a pivot axis such that a wheel axle angle, being an angle between the wheel axle centreline and a line extending parallel to the transversal axis, can be varied, the vehicle further comprising an adjustable reaction actuator connecting a portion of the vehicle body to a portion of the wheel axle whereby a condition of the adjustable reaction actuator controls the wheel axle angle, the method comprising determining a current vehicle operating condition and controlling the adjustable reaction actuator to assume a low roll resistance condition on the basis of the determined vehicle operating condition, the low roll resistance condition resulting in a rolling resistance of the wheel axle assembly being equal to or below a desired rolling resistance value, wherein determining the current vehicle operating condition comprises determining a load imparted on the adjustable reaction actuator, and wherein the method further comprises varying the condition of the adjustable reaction actuator and detecting a resulting load imparted on the adjustable reaction actuator until the resulting load imparted on the adjustable reaction actuator is equal to or below a desired load value.

2. The method of claim 1, wherein determining the current vehicle operating condition comprises determining a current speed of the vehicle.

3. The method of claim 1, wherein determining the current vehicle operating condition comprises determining an axle load imparted on the wheel axle assembly.

4. The method of claim 1, wherein determining the current vehicle operating condition comprises determining ground condition information indicative of the condition of the ground on which the vehicle currently is travelling.

5. The method of claim 4, wherein the ground condition information comprises information indicative of the magnitude and/or direction of the inclination of the ground on which the vehicle currently is travelling.

6. The method of claim 1, wherein the vehicle comprises a propulsion assembly adapted to propel at least the wheels comprised in the wheel axle assembly, the method comprising ensuring that the wheel axle assembly is operated in a free rolling condition in which at least the wheels comprised in the wheel axle assembly are unpowered by, and preferably disconnected from, the propulsion assembly when varying the condition of the adjustable reaction actuator and detecting a resulting load imparted on the adjustable reaction actuator until the resulting load imparted on the adjustable reaction actuator is equal to or below a desired load value.

7. The method of claim 6, wherein the method further comprises comparing the resulting load imparted on the adjustable reaction actuator to a load threshold value and in response to the resulting load imparted on the adjustable reaction actuator being equal to or exceeding the load threshold value, issuing a warning signal, and preferably issuing a warning signal to an operator of the vehicle.

8. The method of claim 1, wherein the adjustable reaction actuator is hydraulically adjustable or electrically adjustable.

9. The method of claim 1, wherein each one of the wheels of the wheel axle assembly is connected to the wheel axle such that a fixed steering angle between the wheel and the wheel axle is obtained.

10. A control unit for controlling a wheel axle assembly of a vehicle, the vehicle comprising a vehicle body with a longitudinal axis extending in a longitudinal direction, a transversal axis extending in a transversal direction, and a vertical axis extending in a vertical direction, the longitudinal axis, the transversal axis, and the vertical axis being perpendicular to each other, wherein the longitudinal direction corresponds to an intended direction of travel of the vehicle and the vertical direction being parallel to a vertical line when the vehicle is positioned on a flat horizontally extending surface, the vehicle body comprising a vehicle body centre plane extending along the longitudinal axis and the vertical axis and separating the vehicle body into two body halves, the wheel axle assembly comprising a wheel axle and at least a first and a second wheel, the first and the second wheels being located on opposite sides of the vehicle body centre plane, the wheel axle having a wheel axle centreline extending in a direction between the first and the second wheels, the wheel axle assembly being pivotally connected to the vehicle body around a pivot axis such that a wheel axle angle, being an angle between the wheel axle centreline and a line extending parallel to the transversal axis, can be varied, the vehicle further comprising an adjustable reaction actuator connecting a portion of the vehicle body to a portion of the wheel axle whereby a condition of the adjustable reaction actuator controls the wheel axle angle, the control unit being adapted to receive vehicle operating information indicative of a current vehicle operating condition and to issue a control signal to the adjustable reaction actuator to assume a low roll resistance condition on the basis of the received vehicle operating information, the low roll resistance condition resulting in a rolling resistance of the wheel axle assembly being equal to or below a desired rolling resistance value, wherein the vehicle operating information comprises information indicative of a load imparted on the adjustable actuator, and wherein the control unit is adapted to issue the control signal to the adjustable reaction actuator such that the condition of the adjustable reaction actuator is varied and receive information indicative of a resulting load imparted on the adjustable reaction actuator until the resulting load imparted on the adjustable reaction actuator is equal to or below a desired load value.

11. The control unit of claim 10, wherein the vehicle operating information comprises information indicative of a current speed of the vehicle.

12. The control unit of claim 10, wherein the vehicle operating information comprises information indicative of an axle load imparted on the wheel axle assembly.

13. The control unit of claim 10, wherein the vehicle operating information comprises ground condition information indicative of the condition of the ground on which the vehicle currently is travelling.

14. The control unit of claim 13, wherein the ground condition information comprises information indicative of the magnitude and/or direction of the inclination of the ground on which the vehicle currently is travelling.

15. The control unit of claim 10, wherein the vehicle comprises a propulsion assembly adapted to propel at least the wheels comprised in the wheel axle assembly, the control unit being adapted to receive information indicative that the wheel axle assembly is operated in a free rolling condition in which at least the wheels comprised in the wheel axle assembly are unpowered by, and preferably disconnected from, the propulsion assembly, and in response thereto issue the control signal to the adjustable reaction actuator such that the condition of the adjustable reaction actuator is varied, and receive information indicative of a resulting load imparted on the adjustable reaction actuator until the resulting load imparted on the adjustable reaction actuator is equal to or below a desired load value.

16. The control unit of claim 15, wherein the control unit is adapted to compare the resulting load imparted on the adjustable reaction actuator to a load threshold value and in response to the resulting load imparted on the adjustable reaction actuator being equal to or exceeding the load threshold value, issue a warning signal, and preferably issue a warning signal to an operator of the vehicle.

17. A vehicle comprising a vehicle body with a longitudinal axis extending in a longitudinal direction, a transversal axis extending in a transversal direction, and a vertical axis extending in a vertical direction, the longitudinal axis, the transversal axis, and the vertical axis being perpendicular to each other,
  wherein the longitudinal direction corresponds to an intended direction of travel of the vehicle and the vertical direction being parallel to a vertical line when the vehicle is positioned on a flat horizontally extending surface,
  the vehicle body comprising a vehicle body centre plane extending along the longitudinal axis and the vertical axis and separating the vehicle body into two body halves,
  the wheel axle assembly comprises a wheel axle and at least a first and a second wheel, the first and the second wheels being located on opposite sides of the vehicle body centre plane, the wheel axle having a wheel axle centreline extending in a direction between the first and the second wheels,
  the wheel axle assembly being pivotally connected to the vehicle body around a pivot axis such that a wheel axle angle, being an angle between the wheel axle centreline and a line extending parallel to the transversal axis, can be varied,
  the vehicle further comprising an adjustable reaction actuator connecting a portion of the vehicle body to a portion of the wheel axle whereby a condition of the adjustable reaction actuator controls the wheel axle angle, and
  the vehicle comprising the control unit of claim 10.

18. The vehicle of claim 17, wherein the adjustable reaction actuator is hydraulically adjustable or electrically adjustable.

19. The vehicle of claim 17, wherein each one of the wheels of the wheel axle assembly is connected to the wheel axle such that a fixed steering angle between the wheel and the wheel axle is obtained.

* * * * *